(12) United States Patent
Sakamoto

(10) Patent No.: US 7,187,641 B2
(45) Date of Patent: Mar. 6, 2007

(54) OBJECTIVE LENS AND OPTICAL PICK-UP APPARATUS

(75) Inventor: Katsuya Sakamoto, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 576 days.

(21) Appl. No.: 10/769,848

(22) Filed: Feb. 3, 2004

(65) Prior Publication Data

US 2004/0156304 A1    Aug. 12, 2004

(30) Foreign Application Priority Data

Feb. 6, 2003    (JP)    ............................. 2003-029618

(51) Int. Cl.
   *G11B 7/00*    (2006.01)
(52) U.S. Cl. .................. 369/112.24; 359/719
(58) Field of Classification Search .......... 369/112.23, 369/112.24, 112.26; 359/365, 366, 719, 359/718, 717
   See application file for complete search history.

(56) References Cited

U.S. PATENT DOCUMENTS 4,447,138 A  *  5/1984  Sugiyama et al. .......... 359/779

| | | | | |
|---|---|---|---|---|
| 5,467,225 | A | * | 11/1995 | Manabe ...................... 359/661 |
| 5,475,536 | A | * | 12/1995 | Kikutani ...................... 359/794 |
| 6,577,456 | B2 | * | 6/2003 | Sato .......................... 359/794 |

* cited by examiner

*Primary Examiner*—Wayne Young
*Assistant Examiner*—Thomas D. Alunkal
(74) *Attorney, Agent, or Firm*—Finnegan, Henderson, Farabow, Garrett & Dunner, L.L.P.

(57) ABSTRACT

An objective lens has a first meniscus-shape lens including a first object-side surface having a positive reflective power; and a second meniscus-shape lens having a positive reflective power. The first meniscus-shape lens and the second meniscus-shape are arranged in that order from an object side. The objective lens satisfies the following formulas:

$fF/f \leq -1.1$ $L_{H_1H_2}/f \geq 0.5$ $fB/f \geq 0.2$ $L/f \leq 1.3$ where f is an object-side focus length of the objective lens, fF is a front focus, fB is a back focus, $L_{H_1H_2}$ is a length between an object-side principal point H1 and an image-side principal point H2, and L is a length on an optical axis of the objective lens between the first object-side surface and the second image-side surface.

17 Claims, 2 Drawing Sheets

FRONT ← → REAR

OBJECTIVE LENS AND OPTICAL PICK-UP APPARATUS

FIELD OF THE INVENTION

The present invention relates to an objective lens and an optical pick-up apparatus using this objective lens.

RELATED ART

In the optical pick-up apparatus used for recording or reproducing of the information using an optical information recording medium (optical disk), a tracking control is one of the essential controls.

There are various methods in the tracking control, and one of them, there is a method by which a light beam is swung by using a galvano-mirror. Then, as the optical pick-up apparatus by which the tracking control is conducted by using the galvano-mirror, an apparatus which is assembled in a telecentric optical system, is well known.

In such an optical pick-up apparatus, generally, the galvano-mirror is arranged at a focal position on an object side of the objective lens, and in the light beam emitted from the light source, it is structured in such a manner that its main ray is moved in parallel with an optical axis, corresponding to a swing angle of the galvano-mirror. Accordingly, there is an advantage that the high accurate tracking control can be comparatively easily realized.

Herein, in order to make the galvano-mirror rotating around a rotating axis not to contact with the objective lens, it is necessary that the galvano-mirror and the objective lens are arranged with an enough distance between them, however, in order to secure the telecentric property as described above, because it is necessary that the rotating axis of the galvano-mirror is arranged on the focal point on the object side, it is necessary that the lens design is conducted so that the focal point on the object side itself is separated from an incident surface of the objective lens.

On the one hand, in order to avoid the contact of a projecting surface of the objective lens with the surface of an optical disk, it is necessary that the distance (operating distance) between the projecting surface of the objective lens and the surface of the optical disk is enough secured. Further, from the point of view of downsizing of the apparatus, it is necessary that the length (axial thickness) in the optical axis direction of the objective lens is suppressed.

Accordingly, for example, as the objective lens for a microscope, when it is structured in such a manner that a plurality of meniscus lenses are combined, a technology by which the operating distance is secured while the total length of the lens system is suppressed, is disclosed (for example, refer to Patent document 1).

[Patent document 1]
  Tokkaihei No. 11-231224

However, in the case of Patent document 1, it can suppress the total length of the lens system and can secure the operating distance, however, a technology by which the focal point on the object side is arranged by being further separated from the objective lens, is not disclosed.

SUMMARY OF THE INVENTION

The object of the present invention considers the above problem, and is to provide an objective lens in which the length in the optical axis direction is suppressed, the operating distance is secured, and further, the object side focal point can be arranged at a position separated from the incident surface of the objective lens, and an optical pick-up apparatus using this objective lens.

The above object can be solved by the following structures. As the first structure of the present invention, it is an objective lens structured by the first lens which is arranged in order from the object side and has the positive refractive power and has the meniscus shape whose convex surface is faced to the object side, and the second lens which has the positive refractive power and has the meniscus shape whose convex surface is faced to the object side.

When an image side focal length of the objective lens is f, a front focus is fF, back focus is fB, the length from the object side principal point H1 to the image side principal point H2 is $L_{H1H2}$, and the distance on the optical axis from the object side surface of the first lens to the object side surface of the second lens is provided by L, it is characterized in that the following expressions (1)–(4) are satisfied.

$fF/f \leq -1.1$      Expression (1)

$L_{H1H2}/f \geq 0.5$      Expression (2)

$fB/f \geq 0.2$      Expression (3)

$L/f \leq 1.3$      Expression (4)

In the above structure, when the first lens and the second lens are made the meniscus shapes which have the positive refractive powers and in which the convex surfaces are faced to the object sides, it is structured in such a manner that the object side principal point H1 is made to be positioned at the front portion from the apex of the incident surface of the first lens, and made to satisfy the condition of $fF/f \leq -1.1$. Accordingly, the distance from the incident surface of the first lens to the object side focal point is long, and a space to arrange the galvano-mirror can be secured. In the present invention, $fF/f \leq -1.2$ is preferable, and $-2.0 \leq fF/f \leq -1.2$ is more preferable.

Further, the objective lens is structured in such a manner that a condition of $L_{H1H2}/f \geq 0.5$ is satisfied. Herein, when, for example, it is provided that the radii of curvature of the incident surface and the projecting surface of the objective lens of a single lens are respectively r1 and r2, refractive index is n, and axial thickness is d, the distance (a principal point interval) HH' from the object side principal point H to the image side principal point H' is generally expressed by the following expression (Arith. 1).

[Arith. 1]

$$HH' = (n-1)d\left\{\frac{r_1 - r_2 - d}{n(r_1 - r_2) - (n-1)d}\right\}$$

As can be seen from [Arith. 1], the principal point interval HH' is unconditionally introduced when r1, r2, n, d are determined. In the present invention, $0.6 \leq L_{H1H2}/f$ is preferable, and $0.6 \leq L_{H1H2}/f \leq 1.0$ is more preferable.

Accordingly, as described above, when the object side principal point is moved further forward than the first lens in order to satisfy the condition of $fF/f \leq -1.1$, in the same manner also the image side principal point is moved forward, and further, the image side focal point is moved forward. In this manner, when the image side focal point is moved forward, the necessity that also the position of the optical disk is moved forward, is generated, and it results in that the distance (operating distance) between the optical disk surface and the projecting surface of the second lens is short. Accordingly, in the present invention, when the objective lens is designed in such a manner that the principal point interval $L_{H1H2}$ satisfies the condition of $L_{H1H2}/f \geq 0.5$, and further, the back focus fB satisfies the condition of $0.2 \leq fB/f$, the enough operating distance can be secured. In the present invention, $0.2 \leq fB/f \leq 0.4$ is preferable.

Further, the objective lens is structured so as to satisfy the condition of $L/f \leq 1.3$. This is, as can be seen from the above [Arith. 1], because the principal point interval $L_{H1H2}$ has the characteristic that it depends on the axial thickness d of the lens (in the present invention, the distance L on the optical axis from the object side surface of the first lens to the image side surface of the second lens), when supposedly, in the design work, the distance L is taken large, it is considered that the condition of $L_{H1H2}/f \geq 0.5$ can be attained comparatively easily, and the condition of $L/f \leq 1.3$ is provided for preventing that the distance L is too large. Further, when the distance L is made not larger than a constant amount (130% of the focal length f), the length in the optical axis direction of whole objective lens is suppressed, and the downsizing of the objective lens can be attained. In the present invention, $L/f \leq 1.2$ is preferable, and $0.5 \leq L/f \leq 1.2$ is more preferable.

In the objective lens of the above-described invention, it is preferable that at least one of the above first lens and the above second lens is an aspherical lens.

Together with that the above effect can be obtained by this structure, when at least one of the first lens and the second lens is an aspherical lens, by utilizing the aberration correction function possessed by the aspherical lens, the objective lens by which the correction of the wavefront aberration can be conducted, can be obtained.

Further one structure of the present invention is an optical pick-up apparatus characterized in that it is provided with the above-described objective lens and the galvano-mirror arranged at the front side focal point position of the objective lens, and the light flux which is reflected by the galvano-mirror and incident on the objective lens is made to be light converged on the information recording surface of the optical information recording medium, and reproducing and/or recording of the information is conducted.

Together with that the above-described effect is obtained by this structure, the downsizing of the optical pick-up apparatus can be attained.

Hereupon, the optical information recording medium indicates a general optical disk by which the reproducing and/or recording of the information is conducted by using the light flux of a predetermined wavelength such as a CD, DVD, CD-R, MD, MO, and high density DVD.

As further one structure of the present invention, it is an optical pick-up apparatus characterized in that it is provided with the above-described objective lens and an image side telecentric optical system which is structured by a stop arranged on the object side to the objective lens, and the light flux which is incident on the objective lens after a light flux diameter is stopped down by the stop, is made to be light converged on the information recording surface of the optical information recording medium, and the reproducing and/or recording of the information is conducted.

Together with that the above-described effect is obtained by this structure, the downsizing of the optical pick-up apparatus can be attained.

PREFERRED EMBODIMENTS OF THE INVENTION

An embodiment when an objective lens according to the present invention is applied for an optical pick-up apparatus will be described below.

Figure 1:
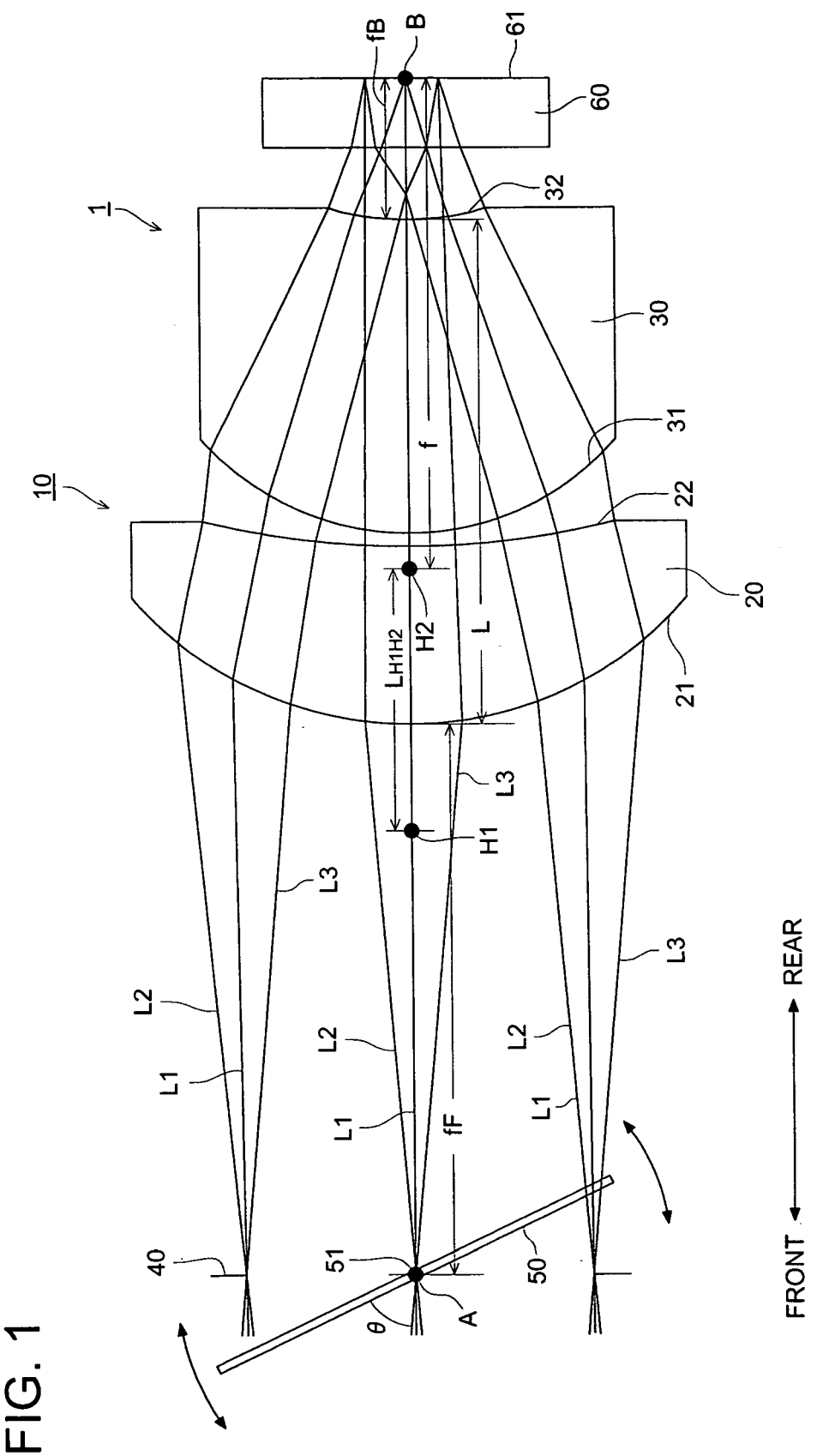
FIG. 1 is a main part plan view showing the structure of an objective lens and an optical pick-up apparatus of the present invention.

As shown in FIG. 1, an objective lens 10 is a image side telecentric lens which is structured in such a manner that the first lens 20 of a single lens and the second lens 30 of a single lens are arranged in order from a object side.

Hereupon, a stop 40 and a galvano-mirror 50 are arranged in front of the first lens 20, and an optical disk (in FIG. 1, only a protective substrate 60 and an information recording surface 61 of the optical disk are shown) is arranged in the rear portion of the second lens 30.

Together with that the first lens 20 has the positive refractive power, the first lens 20 has the meniscus shape in which the paraxial curvature of an incident surface 21 (a surface of the object side) and a projecting surface 22 (a surface of an image side) are positive together, and a convex surface is faced to the object side.

Further, the first lens 20 and the second lens 30 are both aspherical lenses.

When such the first lens 20 and the second lens 30 are arranged in order from the object side by making respective optical axes coincide with each other, the objective lens 10 is structured.

Herein, a sign A in the view shows an object side focal point of the objective lens, a sign B shows an image side focal point, a sign H1 shows an object side principal point, and a sign H2 shows an image side principal point.

Hereupon, as described above, in the present embodiment, because the objective lens 10 is applied for the optical pick-up apparatus, the image side focal point B is positioned in a position which is on the information recording surface 61 and crosses the optical axis.

A galvano-mirror 50 is arranged at the object side focal point A.

Specifically, a rotating axis 51 of the galvano-mirror 50 is arranged so as to coincide with the object side focal point A, and the galvano-mirror 50 is structured in such a manner that it can rotate in the direction shown by an arrow in FIG. 1 within a predetermined range around this rotating axis 51.

Then, when the tracking is conducted, for example, when the light source not shown in the view is arranged so that the advancing direction of the light flux perpendicularly crosses the optical axis, and the galvano-mirror 50 is arranged at a position which forms an angle of $\theta=45°$ with respect to the optical axis, the light flux from the light source advances in the air and lens as shown by a sign L1 in FIG. 1, and is converged on the information recording surface 61 of the optical disk. In this case, the light flux (main light ray) which passed the front side focal point, becomes parallel with the optical axis at the time point when it is projected from the second lens, and is incident on the information recording surface 61 perpendicularly.

Further, when the galvano-mirror 50 is made to be rotated around the rotating axis 51 counterclockwise as shown in FIG. 1, the light flux from the light source advances as shown by a sign L2 in FIG. 1 and is converged on the information recording surface 61. Further, when the galvano-mirror 50 is made to be rotated around the rotting axis 51 clockwise as shown in FIG. 1, the light flux from the light source advances as shown by a sign L3 in FIG. 1, and is converged on the information recording surface 61. In these cases, the main light ray becomes parallel with the optical axis at the time point when it is projected from the second lens, and is incident on the information recording surface 61 perpendicularly.

Further, the objective lens 10 is designed so as to satisfy the following expressions (1) to (4) when the image side focal length (a distance from the image side principal point H2 to the image side focal point B) is f, a front focus (a distance on the optical axis from the incident surface 21 of the first lens 20 to the object side focal point A) is fF, a back focus (a distance on the optical axis from the projecting surface 32 of the second lens 30 to the image side focal point B) is fB, the length (a principal point interval) from the object side principal point H1 to the image side principal point H2 is $L_{H1H2}$, and a distance on the optical axis from the incident surface 21 of the first lens 20 to the projecting surface 32 of the second lens 30 is provided as L.

$fF/f \leq -1.1$      Expression (1)

$L_{H1H2}/f \geq 0.5$      Expression (2)

$fB/f \geq 0.2$      Expression (3)

$L/f \leq 1.3$      Expression (4)

Hereupon, because the advancing direction (the right direction in FIG. 1) of the light is positive, a value of fF is negative.

When an absolute value of the front focus fF and the object side focal length f are compared, the expression (1) specifies that the absolute value of the front focus fF is not smaller than 1.1 times of the object side focal length f. By satisfying the expression (1), the distance from the incident surface 21 of the first lens 20 to the object side focal point A becomes long, and a space in which the galvano-mirror 50 is arranged can be secured.

In the present invention, when the first lens and the second lens are structured in such a manner that they have positive refractive powers and they are made the meniscus shapes which face the convex surfaces to the object side, the principal point H1 on the object side is made to be positioned in a forward position from the apex of the incident surface 21 of the first lens, and made to satisfy the condition of the expression (1).

For example, when the absolute value of the length of the front focus is not larger than 1.1 times of the object side focal length, the distance from the incident surface 21 of the first lens 20 to the object side focal point A becomes short, and when the galvano-mirror 50 is rotated, a possibility that it is brought into contact with the first lens 20, is generated.

The expression (2) specifies that the principal point interval $L_{H1H2}$ is not too short compared to the focal length f, that is, the principal point interval is not smaller than a constant amount (the length of a half of the focal length f).

As described above, this shows that, generally, the distance (principal point interval) HH' from the object side principal point H to the image side principal point H' is expressed by the above-described [Arith. 1] by the radii of curvature r1 and r2 of the incident surface and projecting surface of the objective lens of the single lens, refractive index n, and axial thickness d, and the principal point interval HH' is unconditionally introduced when r1, r2, n, and d are determined.

Accordingly, in the present invention, when the object side principal point H1 is moved forward from the first lens 20, the image side principal point H2 and the image side focal point B are moved forward, and resultantly, the distance (operating distance) between the optical disk surface and the projecting surface 32 of the second lens 30 becomes short.

Accordingly, relating to the principal point interval $L_{H1H2}$, when the objective lens 10 is designed so that the condition of the expression (2) and the condition of the expression (3) are satisfied, a enough operating distance can be secured.

For example, when $L_{H1H2}/f$ is not larger than 0.5, or when the back focus fB is shorter than 20% of the focal length f, the operating distance becomes short, and a possibility that the rotating optical disk is brought into contact with the second lens 30, is generated.

Further, as can be seen from the above-described [Arith. 1], because the principal point interval has the characteristic that it depends on the axial thickness d of the lens (in the present invention, the distance on the optical axis L from the incident surface 21 of the first lens 20 to the projecting surface 32 of the second lens 30), when temporarily, the distance L is taken large in the design work, it is considered that the condition of $L_{H1H2}/f \geq 0.5$ can be comparatively easily attained, and the condition of the expression (4) is provided for preventing that the distance L becomes too large. Further, when the distance L is made not larger than a predetermined amount (130% of the focal length f), the length in the optical axis direction of the whole objective lens 10 is suppressed, and the downsizing of the objective lens 10 can be attained.

For example, when the distance L is not shorter than 1.3 times of the focal length f, a disadvantage that the objective lens 10 and the optical pick-up apparatus 1 are large-sized, is generated.

Hereupon, in the present embodiment, the first lens 20 and the second lens 30 are made both aspherical lenses, but it is not limited to this, only one of the first lens 20 and the second lens 30 may also be an aspherical lens, and further, both may also be spherical lenses.

Further, in the present embodiment, it is described when the objective lens 10 is applied for the optical pick-up apparatus 1, but it is not limited to this, for example, it can apply for an apparatus such as a camera or a microscope for which the telecentric property is required.

EXAMPLES

Next, an example of the objective lens will be described.

The objective lens of the present embodiment is, in the same manner as shown in FIG. 1, an aspherical lens in which both the first lens and the second lens have the positive refractive indexes, and the meniscus shapes in which the convex surfaces are faced to the object side.

Further, a stop and a galvano-mirror are arranged in front of the first lens.

In Table 1 and Table 2, the lens data of the first lens and the second lens is shown.

TABLE 1

| f: | 4.003 mm | $L_{H1H2}$: | 2.631 mm |
| fB: | 1.015 mm | L: | 4.620 mm |
| fF: | −5.003 mm | | |

| The i-th surface | ri | di | ni (650 nm) | |
|---|---|---|---|---|
| | 0 | | ∞ | |
| | 1 | ∞ | 5.000 | | stop diameter Φ3.6 mm |
| L1 | 2 | 2.6550 | 1.980 | 1.5119 | CF3 (HOYA) |
| | 3 | 13.5477 | 0.100 | 1.0 | |
| L2 | 4 | 3.1681 | 2.540 | 1.5481 | SbF1 (HOYA) |
| | 5 | 3.3687 | 0.622 | 1.0 | |
| | 6 | ∞ | 0.600 | 1.5260 | |
| | 7 | ∞ | 0.000 | 1.0 | |

TABLE 2

Aspheric surface data

| The second surface Aspheric surface coefficient | |
|---|---|
| κ | −5.1198 × E−1 |
| A4 | +1.5672 × E−3 |
| A6 | −6.3646 × E−4 |
| A8 | +4.5849 × E−5 |
| The fourth surface Aspheric surface coefficient | |
| κ | +1.4848 × E−1 |
| A4 | −4.4595 × E−3 |
| A6 | +5.5980 × E−3 |
| A8 | −1.2888 × E−3 |
| A10 | +1.6873 × E−4 |
| The fifth surface Aspheric surface coefficient | |
| κ | −3.6346 × E−0 |
| A4 | +4.1554 × E−2 |
| A6 | +4.6902 × E−1 |
| A8 | −8.9193 × E−1 |
| A10 | +9.2200 × E−1 |

As shown in Table 1, in the present embodiment, the light flux of the wavelength 650 nm is used, and it is designed in such a manner that the image side focal length of the objective lens f=4.003 mm, back focus fB=1.015 mm, front focus fF=−5.003 mm, principal point interval $L_{H1H2}$=2.631 mm, and the distance on the optical axis from the incident surface of the first lens to the projecting surface of the second lens L=4.620 mm.

Accordingly, fF/f=−1.250, $L_{H1H2}$/f=0.657, fB/f=0.254, and L/f=1.154, and they respectively satisfy the conditions of fF/f≦−1.1, $L_{H1H2}$/f≧0.5, fB/f≧0.2, and L/f≦1.3.

The first lens L1 is set in such a manner that the paraxial radius of curvature of the incident surface (the second surface) is 2.6550 mm, and the paraxial radius of curvature of the projecting surface (the third surface) is 13.5477 mm, and has the meniscus shape in which the convex surface is faced to the object side.

The second lens L2 is set in such a manner that the paraxial radius of curvature of the incident surface (the fourth surface) is 3.1681 mm, and the paraxial radius of curvature of the projecting surface (the fifth surface) is 3.3687 mm, and has the meniscus shape in which the convex surface is faced to the object side.

Hereupon, di in the Table 1 shows the distance in the optical axis direction from the i-th surface to the (i+1)-th surface, and ni expresses the refractive index between the i-th surface and the (i+1)-th surface to the light flux of the wavelength 650 nm.

The incident surface of the first lens L1 and the incident surface and the projecting surface of the second lens L2 are respectively specified by the equation in which the coefficients shown in Table 1 and Table 2 are interposed into the following equation (Arith. 2). They are formed into a symmetrical aspheric surface with respect to the optical axis.

[Arith. 2]

An equation of the aspheric surface shape $$X(h) = \frac{(h^2/r_i)}{1+\sqrt{1-(1+\kappa)(h/r_i)^2}} + \sum_{i=0}^{5} A_{2i} h^{2i}$$

Herein, X(h) is an axis in the optical axis L direction (an advancing direction of the light is defied as positive), κ is a conical coefficient and $A_{2i}$ is an aspheric surface coefficient.

Figure 2A:
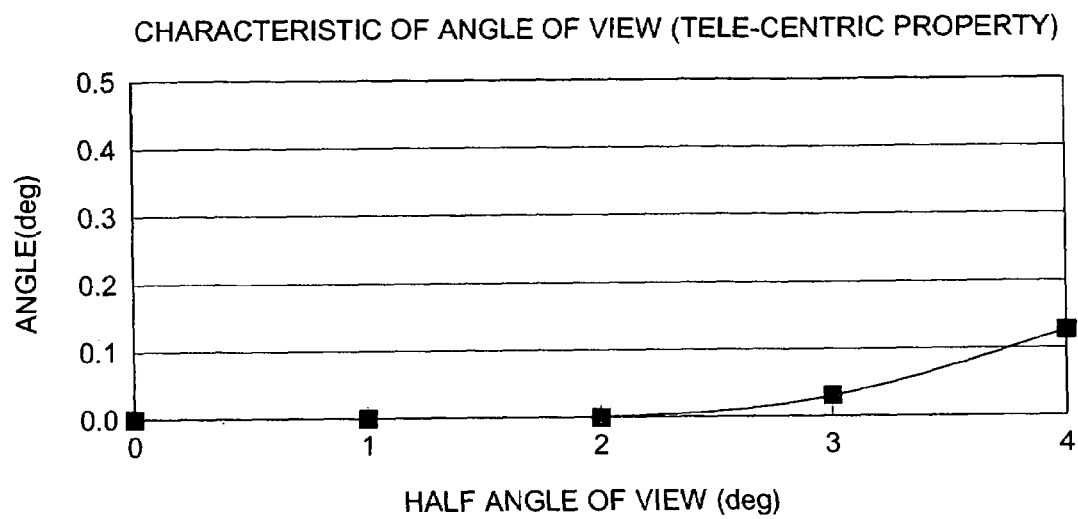
FIGS. 2(a) and 2(b) are graphs relating to the characteristic of an angle of view.
Figure 2B:
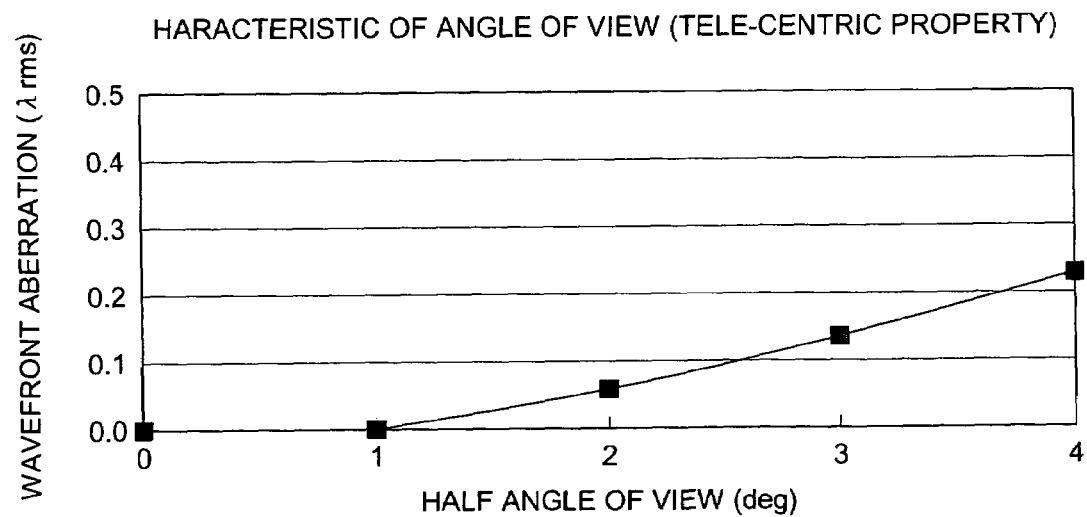

FIG. 2(a) is a graph showing the telecentric property (tele-cen property) as the angle of view characteristic of the objective lens, and FIG. 2(b) is a graph showing the wavefront aberration as the angle of view characteristic of the objective lens.

The horizontal axis of the graph of FIG. 2(a) is an angle of half (half angle of view) of an angle (angle of view) in which the light flux passing through the object side focal point forms with respect to the optical axis, and the vertical axis expresses the wavefront aberration.

From FIG. 2(a), the wavefront aberration of the light flux passing through the object side focal point at the half angle of view 4°, is about 0.04 λrms. Generally, when the wavefront aberration is not larger than 0.07 λrms, because it is said that a trouble is not practically caused, it can be judged that the objective lens in the present embodiment enough has also the function to correct the wavefront aberration.

EFFECTS OF THE INVENTION

According to the present invention, the distance from the incident surface of the first lens to the object side focal point becomes long, and a space in which the galvano-mirror is arranged cab be secured.

Further, the sufficient operating distance can be secured, and the length in the optical axis direction of whole the objective lens is suppressed, and the downsizing of the objective lens and the optical pick-up apparatus can be attained.

Further, an objective lens by which the wavefront aberration can be corrected, can be obtained.

What is claimed is:

1. An objective lens, comprising:
    a first meniscus-shape lens including a first object-side surface, which has a convex surface, and a first image-side surface, the first meniscus-shape lens having a positive reflective power; and
    a second meniscus-shape lens including a second object-side surface, which has a convex surface, and a second image-side surface, the second meniscus-shape lens having a positive reflective power;
    the first meniscus-shape lens and the second meniscus-shape lens being arranged in that order from an object side, wherein the objective lens satisfies the following formulas:

$$fF/f \leq -1.1$$

$$L_{H_1H_2}/f \geq 0.5$$

$$fB/f \geq 0.2$$

$$L/f \leq 1.3$$

where f is an object-side focus length of the objective lens, fF is a front focus, fB is a back focus, $L_{H_1H_2}$ is a length between an object-side principal point H1 and an image-side principal point H2, and L is a length on an optical axis of the objective lens between the first object-side surface and the second image-side surface.

2. The objective lens of claim 1, wherein the objective lens suffices the following formula $$fF/f \leq -1.2.$$

3. The objective lens of claim 1, wherein the objective lens suffices the following formula $$-2.0 \leq fF/f.$$

4. The objective lens of claim 2, wherein the objective lens suffices the following formula $$-2.0 \leq fF/f.$$

5. The objective lens of claim 1, wherein the objective lens suffices the following formula $$L_{H_1H_2}/f \geq 0.6.$$

6. The objective lens of claim 1, wherein the objective lens suffices the following formula $$L_{H_1H_2}/f \leq 1.0.$$

7. The objective lens of claim 5, wherein the objective lens suffices the following formula $$L_{H_1H_2}/f \leq 1.0.$$

8. The objective lens of claim 1, wherein the objective lens suffices the following formula $$fB/f \leq 0.4.$$

9. The objective lens of claim 1, wherein the objective lens suffices the following formula $$L/f \leq 1.2.$$

10. The objective lens of claim 1, wherein the objective lens suffices the following formula $$0.5 \leq L/f.$$

11. The objective lens of claim 10, wherein the objective lens suffices the following formula $$0.5 \leq L/f.$$

12. The objective lens of claim 1, wherein the objective lens suffices the following formulas $$-2.0 \leq fF/f \leq -1.2$$

$$0.6 \leq L_{H_1H_2}/f \leq 1.0$$

$$0.2 \leq fB/f \leq 0.4$$

$$0.5 \leq L/f \leq 1.2.$$

13. The objective lens of claim 1, wherein at least one of the first meniscus-shape lens and the second meniscus-shape lens is an aspherical lens.

14. The objective lens of claim 13, wherein each of the fist meniscus-shape lens and the second meniscus-shape lens is an aspherical lens.

15. An optical pick-up apparatus, comprising:
the objective lens of claim 1; and
a Galvano mirror, which is arranged at a position corresponding to a focus point of an objective side of the objective lens,
wherein the optical pick-up apparatus is capable of reproducing information from or recording information on an optical information recording media by conversing a light flux, which is reflected by the Galvano mirror and enters the objective lens, on an information recording surface of the optical information recording media.

16. The optical pick-up apparatus of claim 15, wherein the optical pick-up apparatus further comprises an aperture being arranged at an object side of the objective lens.

17. An optical pick-up apparatus, comprising:
an optical system including the objective lens of claim 1 and an aperture being arranged at an object side of the objective lens, the optical system being an image-side telecentric optical system,
wherein the optical pick-up apparatus is being capable of reproducing information from or recording information on an optical information recording media by converging a light flux, which enters the objective lens after a light flux diameter of the light flux being narrowed by the aperture.

* * * * *